US008977484B1

(12) United States Patent
La Civita

(10) Patent No.: US 8,977,484 B1
(45) Date of Patent: Mar. 10, 2015

(54) USING AIRCRAFT TRAJECTORY DATA TO INFER AIRCRAFT INTENT

(71) Applicant: The Boeing Company, Chicago, IL (US)

(72) Inventor: Marco La Civita, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/972,911

(22) Filed: Aug. 22, 2013

(51) Int. Cl.
*G06F 19/00* (2011.01)
*G08G 5/00* (2006.01)

(52) U.S. Cl.
CPC .................................... *G08G 5/0026* (2013.01)
USPC .............................. 701/120; 701/14; 340/945

(58) Field of Classification Search
CPC .................................................... G08G 5/0039
USPC ................. 701/120, 3, 14, 301; 340/945, 947
See application file for complete search history.

(56) References Cited

U.S. PATENT DOCUMENTS

| | | | |
|---|---|---|---|
| 4,086,632 | A | 4/1978 | Lions |
| 5,057,835 | A | 10/1991 | Factor et al. |
| 5,398,186 | A | 3/1995 | Nakhla |
| 5,842,142 | A | 11/1998 | Murray et al. |
| 6,519,527 | B2 | 2/2003 | Shinagawa |
| 6,573,841 | B2 | 6/2003 | Price |
| 6,643,580 | B1 | 11/2003 | Naimer et al. |
| 6,804,585 | B2 | 10/2004 | Humbard et al. |
| 6,963,291 | B2 | 11/2005 | Holforty et al. |
| 7,689,328 | B2 | 3/2010 | Spinelli |
| 7,693,614 | B2 | 4/2010 | Turung |
| 7,874,521 | B2 | 1/2011 | Shuster |
| 2002/0140578 | A1 | 10/2002 | Price |
| 2003/0060940 | A1 | 3/2003 | Humbard et al. |
| 2005/0216138 | A1 | 9/2005 | Turung |

(Continued)

FOREIGN PATENT DOCUMENTS

| | | | |
|---|---|---|---|
| EP | 1796060 | A1 | 6/2007 |
| EP | 2040137 | A1 | 3/2009 |

(Continued)

OTHER PUBLICATIONS

Extended European Search Report, dated Feb. 4, 2013, regarding Application No. EP12382273.6, 8 pages.

(Continued)

*Primary Examiner* — Thomas G Black
*Assistant Examiner* — Luke Huynh
(74) *Attorney, Agent, or Firm* — Yee & Associates, P.C.

(57) ABSTRACT

A method is provided for inferring the aircraft intent of an aircraft from an observed trajectory. Aircraft performance data relating to that type of aircraft is retrieved from memory, along with atmospheric conditions along the observed trajectory. An initial set of candidate aircraft intents is generated. Each aircraft intent provides an unambiguous description of how the aircraft may be flown that allows a determination of an unambiguous resulting trajectory. A computer system calculates a trajectory defined by each candidate aircraft intent and forms a cost function from a comparison of each calculated trajectory to the observed trajectory. An evolutionary algorithm evolves the initial candidate aircraft intents, wherein the evolutionary algorithm uses a multi-objective cost function to obtain a cost function value that measures the suitability of each candidate aircraft intent.

20 Claims, 8 Drawing Sheets

(56) References Cited

U.S. PATENT DOCUMENTS

| | | | |
|---|---|---|---|
| 2007/0138345 A1 | 6/2007 | Shuster | |
| 2008/0154447 A1 | 6/2008 | Spinelli | |
| 2008/0221745 A1 | 9/2008 | Diamandis et al. | |
| 2010/0161156 A1 | 6/2010 | Coulmeau et al. | |
| 2010/0305781 A1 | 12/2010 | Felix | |
| 2011/0264312 A1 | 10/2011 | Spinelli et al. | |
| 2013/0006450 A1 * | 1/2013 | Del Amo Blanco et al. | ... 701/14 |

FOREIGN PATENT DOCUMENTS

| | | | |
|---|---|---|---|
| WO | WO2009042405 A2 | 4/2009 | |
| WO | WO2011152917 A2 | 12/2011 | |

OTHER PUBLICATIONS

Krozel, "Intent Inference for Free Flight Aircraft", AIAA Guidance, Navigation, and Control Conference and Exhibit, AIAA-00-4479, Aug. 2000, 11 pages.

Krozel et al., "Intent Inference with Path Prediction", Journal of Guidance, Control, and Dynamics, vol. 29, No. 2, Mar.-Apr. 2006, pp. 225-236.

Lovera Yepes et al, "New Algorithms for Aircraft Intent Inference and Trajectory Prediction", Journal of Guidance, Control, and Dynamics, vol. 30, No. 2, Mar.-Apr. 2007, pp. 370-382.

López Leonés, "REACT Project: Preliminary Set of Requirements for an AIDL", REACT Workshop, Jun. 2008, 29 pages.

Vilaplana, "Intent Synchronization", Eurocontrol/FAA Workshop on Avionics for 2011 and Beyond, Oct. 2005, 19 pages.

European Search Report, dated May 26, 2008, regarding Application No. EP07380259, 1 page.

International Search Report and Written Opinion, dated Sep. 15, 2010, regarding Application No. PCT/US2008/075877, 9 pages. (06-1076 PCT).

Gallo et al., "Advanced Aircraft Performance Modeling for ATM: BADA 4.0 Results", 25th Digital Avionics Systems Conference, Oct. 2006, IEEE, 12 pages.

Vilaplana et al., "Towards a formal language for the common description on aircraft intent", 24th Digital Avionics Systems Conference, Oct. 2005, IEEE, 9 pages.

López Leonés, "Definition of an Aircraft Intent Description Language for Air Traffic Management Applications", Doctor of Philosophy Thesis, University of Glasgow, Feb. 2008, 404 pages.

Office Action dated Sep. 10, 2012, regarding U.S. Appl. No. 12/679,275, 13 pages.

Final Office Action, dated Apr. 8, 2013, regarding U.S. Appl. No. 12/679,275, 21 pages.

International Search Report and Written Opinion, dated Nov. 21, 2011, regarding Application No. PCT/US2011/028795, 10 pages.

Offer et al., "Aircraft Emergency Landing Route System", U.S. Appl. No. 13/746,076, filed Jan. 22, 2013, 89 pages.

Office Action dated Jun. 22, 2012, regarding U.S. Appl. No. 12/764,797, 16 pages.

Final Office Action, dated Feb. 13, 2013, regarding U.S. Appl. No. 12/764,797, 13 pages.

* cited by examiner

USING AIRCRAFT TRAJECTORY DATA TO INFER AIRCRAFT INTENT

BACKGROUND INFORMATION

1. Field

The present invention relates to a method of providing data relating to the aircraft intent of an aircraft using observations of the aircraft's trajectory. The inferred aircraft intent may be used for predicting the future trajectory of the aircraft, for use in conflict resolution within air traffic management, or for analyzing air traffic management.

2. Background

The ability to describe, and also to predict, an aircraft's trajectory is useful for many reasons. By trajectory, a four-dimensional description of the aircraft's path is meant. The description may be the evolution of the aircraft's state with time, where the state may include the position of the aircraft's center of mass and other aspects of its motion such as velocity, attitude and weight. In order to predict an aircraft's trajectory unambiguously, one must solve a set of differential equations that model both aircraft behavior and atmospheric conditions.

Aircraft intent is described using a formal language that describes how the aircraft is to be flown. The aircraft intent contains instructions that define aspects of motion and configuration of the aircraft. The aircraft intent contains sufficient information to allow an unambiguous determination of an aircraft's trajectory, i.e. the information that the aircraft intent contains closes all degrees of freedom of the aircraft's motion. The aircraft intent may be expressed as a series of instructions spanning part of a trajectory, with each instruction's length defining a flight segment. Each degree of freedom is described as a thread, and an instruction may operate on one or more threads. Thus, combinations of instructions may operate together to close all degrees of freedom of the aircraft.

The aircraft intent that comprises a structured set of instructions is used by a trajectory computation infrastructure to calculate the resulting unambiguous trajectory. As noted above, the instructions should include both configuration details of the aircraft (e.g. landing gear deployment) and procedures to be followed during maneuvers and normal flight (e.g. track certain turn radius or hold a given airspeed). These instructions capture the basic commands and guidance modes at the disposal of the pilot and the aircraft's flight management system to direct the operation of the aircraft. Thus, aircraft intent may be thought of as an abstraction of the way in which an aircraft is commanded to behave by the pilot and/or flight management system into a set of instructions that unambiguously capture the information and allow an unambiguous trajectory to be calculated.

EP patent application 07380259.7, published as EP-A-2, 040,137, also in the name of The Boeing Company, describes aircraft intent in more detail, and the disclosure of this application is incorporated herein in its entirety by reference.

Knowledge of aircraft intent is useful in air traffic management. Knowledge of an aircraft's intent in advance allows accurate predictions of aircraft trajectories to be made that may be used to aid conflict detection and resolution. Furthermore, knowledge of aircraft intent after a trajectory has been flown may be of use in analyzing air traffic management, for example to assess how efficiently the air traffic management performs in areas such as fuel efficiency and noise performance. While aircraft intent data may be provided by the aircraft or the aircraft operator, aircraft intent data is not always readily available to other interested parties. In such situations, it may be useful for other interested parties to be able to obtain the aircraft intent in some other way.

Therefore, it would be advantageous to have a method and apparatus that takes into account one or more of the issues discussed above, as well as other possible issues.

SUMMARY

Against this background and from a first aspect, the present disclosure resides in a computer-implemented method of inferring the aircraft intent of an aircraft from an observed trajectory of the aircraft. The method comprises obtaining the observed trajectory of the aircraft. The observed trajectory may comprise a time-evolving sequence of positions of the aircraft. The observed trajectory may be determined from radar data, or ADS data like ADS-B data or ADS-C data.

The method also comprises determining the type of the aircraft and retrieving from memory aircraft performance data relating to that type of aircraft. For example, radar traces or other radar/ADS data may be used to identify each aircraft's call sign or tail number, and this may be correlated against records to determine the aircraft's type (e.g. Boeing 777).

Data regarding the atmospheric conditions along the observed trajectory are retrieved. For example, the observed trajectory may be used to retrieve only the atmospheric conditions pertaining to that trajectory from a database of atmospheric conditions covering the general region of airspace through which the aircraft passed.

The aircraft intent is inferred using evolutionary algorithms. The starting point is generating an initial set of candidate aircraft intents. Each candidate aircraft intent provides an unambiguous description of how the aircraft may be flown; this unambiguous description allows a determination of an unambiguous resulting trajectory. Although the initial set of candidate aircraft intents may not produce trajectories that match the observed trajectory with a desired accuracy, they may be evolved into candidate aircraft intents with trajectories that do match the observed trajectory at a desired accuracy.

The method further comprises providing as inputs to a computer system the initial set of candidate aircraft intents, the aircraft performance data, and the atmospheric conditions data. Then, the computer system is used to calculate from the inputs a calculated trajectory defined by each candidate aircraft intent. The evolutionary algorithm includes a cost function to allow it to measure the suitability of the candidate aircraft intents it produces. This allows the best candidate aircraft intents to be retained for further evolution towards better and better candidate aircraft intents. Thus, the method may comprise the computer system forming a cost function from a comparison of each calculated trajectory to the observed trajectory.

In a further function, the computer system may use the evolutionary algorithm to evolve the set of initial candidate aircraft intents into an evolved set of candidate aircraft intents. Iterations of the evolutionary algorithm are repeated to evolve further the candidate aircraft intents of the evolved set. The evolutionary algorithm uses the multi-objective cost function to obtain a cost function value that measures the suitability of each candidate aircraft intent.

The evolutionary algorithm terminates, and the computer system provides one or more candidate aircraft intents with the best cost function value or values respectively. Many different schemes may be used to determine when to terminate the evolutionary algorithm. Examples, which may or may not be combined, include: performing a set number of iterations, repeating until the cost function value of one or a selected number of candidate aircraft intents meet a required value, repeating until the average cost function value of a set number of candidate aircraft intents meets a required value, and waiting for the evolution to converge as measured by the change in cost function values of all or a set number of candidate aircraft intents. Where a set number of candidate aircraft intents are used, preferably a set number of the candidate aircraft intents with the best cost function values are used.

Thus, the present disclosure makes use of indirect measurements, which are readily available in today's airspace management systems, to derive information about the aircraft intent of the aircraft. There are no requirements for special airborne equipment or for an additional data communication infrastructure. Moreover, the aircraft are only passively involved and so there is no requirement for the aircraft to collaborate actively. This aircraft intent may be used in a predictive and/or in an analytical way.

For example, analysis of the performance of air traffic management may be performed. This may be done to measure efficiency, in terms of throughput, delays to aircraft, fuel efficiency and noise minimization.

The aircraft intent is preferably expressed using a formal language.

Predictive uses require fast analysis of a trajectory of an aircraft still in flight to allow the future aircraft intent of that aircraft to be predicted, and hence its future trajectory to be predicted. For example, the inferred aircraft intent may conform to that required by a standard terminal arrival route (STAR) or a standard instrument departure (SID). Then, it may be assumed that the aircraft will continue to follow the identified STAR or SID.

The method may further comprise providing as a further input to the computer system initial conditions of the aircraft. Then, the calculated trajectory defined by each candidate aircraft intent may be calculated from the inputs and the further input. The method may comprise generating a common set of initial conditions from the observed trajectory. That is, the observed trajectory may be used to determine the initial position of the aircraft. Moreover, the rate of change of position of the aircraft during the initial part of the observed trajectory may be used to derive speed information. Alternatively, the method may comprise generating different sets of initial conditions from the candidate aircraft intents. For example, the candidate aircraft intents will by their nature provide a definition of the initial conditions of the aircraft including position and speed.

Preferably, the method includes a random element in how the initial set of candidate aircraft intents is generated. For example, the method may further comprise retrieving a set of bounds. Then, the initial set of candidate aircraft intents may be generated to include randomly-generated values that are constrained to remain within the bounds. For example, the randomly-generated values may correspond to values of airspeeds, rates of climb, bank angles, and high lift device settings. The bounds may provide safe or usual limits to these values, such as limiting the airspeeds to those recommended for the aircraft type or bank angles to a range that ensures passenger comfort. Furthermore, the initial set of aircraft intents may be randomly generated while being guided to provide a broad range of candidate aircraft intents. That is values with broad ranges of variation may be produced to ensure diversity in the initial set of candidate aircraft intents.

Different metrics may be used to derive the cost function. For example, the cost function may be based upon a point-by-point score derived from summing the deviation of the respective calculated trajectory from the observed trajectory at each of a number of points sampled along the observed trajectory. This rewards a low average deviation. The cost function may be based upon an overall consistency score derived from the length of the respective calculated trajectory that deviates from the observed trajectory by less than a threshold value. This may reward calculated trajectories that deviate from the observed trajectory by less than a threshold value over the greatest part of their extent. The above two metrics may be combined. This is useful as the two different metrics reward two different behaviors. Use of the first metric will drive the candidate aircraft intents to produce trajectories with the lowest average deviation, but this may produce trajectories with very low deviations in some parts and very high deviations in other parts which may not be desirable. In contrast, the second metric punishes trajectories with extremely low and high deviations as it promotes trajectories that produce reasonable matches to the observed trajectory for as much of the observed trajectory as possible.

The candidate aircraft intents may comprise threads, each thread defining one of the degrees of freedom of the aircraft. Each thread may extend from the start of the trajectory to the end of the trajectory. Generating the initial set of candidate aircraft intents may comprise, for each candidate aircraft intent, filling each thread with one or more instructions. As each thread is then completely defined, and as the threads together define all degrees of freedom of the aircraft, this method necessarily closes all degrees of freedom of the aircraft throughout the observed trajectory and so gives rise to an unambiguous trajectory.

The degrees of freedom may comprise both degrees of freedom of motion of the aircraft and degrees of freedom of configuration of the aircraft. There may be three degrees of freedom of motion, for example two directional degrees (to define lateral and vertical motion) and a speed degree most likely defined with reference to the throttle setting. There may be three degrees of freedom of configuration, for example speed brakes, high lift devices and landing gear. Hence, this would provide six threads.

An instruction may cover more than a single thread, i.e. an instruction may define aspects relating to more than a single degree of freedom. For example, a VNAV vertical navigation instruction may define vertical motion and speed so occupying one of the threads relating to motion as well as the thread relating to throttle setting.

Evolving the candidate aircraft intents may comprise evolving the instructions. For example, the types of instructions may vary, or the values an instruction defines may vary.

Generating the initial set of candidate aircraft intents may comprise, for each candidate aircraft intent, filling each thread with an instruction such that each thread contains only a single instruction spanning the entire trajectory. The calculated trajectories may be divided into flight segments defined by the instructions. That is, the start and end of the flight segments may be defined by the starts and ends of the instructions. For example, the trajectory may be divided according to the instructions; whenever an instruction in any of the threads ends, a break between flight segments may be provided. Not all instructions need necessarily start and end together. However, the division into flight segments allows each flight segment to be defined by the instructions it contains. The instructions of some threads may not change between consecutive flight segments, although at least one instruction must change between flight segments.

Further, the method may comprise using the evolutionary algorithm to evolve a set of evolved candidate aircraft intents in a stepwise manner. Each step may comprise optimizing the candidate aircraft intents for one flight segment, and proceeding one flight segment at a time. Optionally, the first flight segment is evolved first, that is the flight segment starting with the start of the observed trajectory. Then the next flight segment may be evolved, then the next, and so on.

To this end, the method may comprise evolving the initial set of candidate aircraft intents iteratively to form the evolved set of candidate aircraft intents while allowing the length of the instructions to vary while keeping the start of each instruction tied to the start of the observed trajectory. That is, the initial set of candidate aircraft instructions that have a single instruction per thread are evolved such that they are constrained to have only a single instruction per thread, but with the length of that instruction being allowed to vary. As the start of the instruction must match the start of the observed trajectory, a variable length flight segment result is determined by how long the instruction remains active. Not all instructions of a candidate aircraft intent need have the same length; in which case the length of the first flight segment will be determined by the shortest instruction.

As the candidate aircraft intents no longer span the entire observed trajectory, the evolutionary algorithm uses the multi-objective cost function to obtain a cost function value that measures the goodness of each candidate aircraft intent based upon a comparison of the calculated trajectory with the corresponding portion of the observed trajectory that the flight segment spans.

Once the evolutionary algorithm has evolved the evolved set of candidate aircraft intents for the first flight segment, the computer system retains the candidate aircraft intents with the best cost function values. The computer system then uses the evolutionary algorithm to perform outer loops of iterations and inner loops of iterations, as follows.

The outer loop of iterations comprises generating a further initial set of candidate aircraft intents. This is done by generating multiple copies of the retained aircraft intents. In general, each aircraft intent will contain a flight segment ending before the end of the observed trajectory. For any retained candidate aircraft intents having complete trajectories (i.e. with each thread filled by an instruction), no further changes are necessary. For the other retained candidate aircraft intents, the threads are supplemented with instructions to extend from the end of the last flight segment to the end of the trajectory such that each thread is again filled by instructions spanning the entire trajectory. Each instruction may be generated randomly, as described before.

Next, each iteration of the outer loop performs repeated iterations of the inner loop. Each iteration of the inner loop may comprise evolving the further initial set of candidate aircraft intents to form further evolved sets of candidate aircraft intents. The evolution allows the length of the instructions occupying the final flight segment to vary while keeping the start of each instruction tied to the end of the previous instruction. That is, again and again the instructions are allowed to move away from the end of the observed trajectory to define a new flight segment. In this way, actual flight segments in the observed trajectory may be replicated. For example changes in flight segments corresponding to the pilot switching autopilot guidance modes may be replicated. As before, the evolutionary algorithm may use the multi-objective cost function to obtain a cost function value that measures the goodness of each candidate aircraft intent based upon a comparison of the calculated trajectory calculated from the start of the observed trajectory to the end of the final flight segment with the corresponding portion of the observed trajectory. Alternatively, the comparison may be made of the calculated trajectory for the latest flight segment with the corresponding portion of the observed trajectory.

The end of each iteration of the outer loop may see the candidate aircraft intents with the best cost function values retained. Iterations of the outer loop are repeated until an evolved set of candidate solutions is produced that includes candidate aircraft intents with threads that are filled with instructions to span the entire observed trajectory. This may be implemented in different ways. For example, the outer loop may terminate when all retained candidate aircraft intents have full threads, or when one candidate aircraft intent has full threads or when some other number of candidate aircraft intents have full threads. When the outer loop terminates, all or some of the retained candidate aircraft intents may be provided.

The use of flight segments allows another metric to be used when forming the cost function. A metric may be included that rewards candidate aircraft intents with fewer flight segments and penalizes candidate aircraft intents with more flight segments. This helps constrain the evolutionary algorithm that may otherwise excessively segment a trajectory to achieve better and better matches between the calculated trajectory and the observed trajectory.

How evolutionary algorithms operate to evolve solutions, candidate aircraft intents in the present context, is well understood. For example, strategies like retention of the fittest solutions, cross-breeding (particularly between fit solutions) and maintenance of diversity through iterations by injecting mutations into solutions and even injecting new, random solutions are well known and may all be used with the present method. Further details are provided below.

Any of the above methods may comprise providing multiple candidate aircraft intents with the best cost function values to a user for the user to select a preferred candidate aircraft intent. This allows the user to select the most appropriate candidate aircraft intent. Many candidate aircraft intents may be suitable for selection. This may be due to the accuracy of the evolutionary algorithm providing alternatives that all fit the trajectories reasonably well, but in different ways. This may partly or wholly arise from competing objectives in the cost function. For example, the contention between the point-to-point score and the overall score may drive the evolutionary algorithm to generate Pareto optimal solutions, and solutions on the optimal Pareto front may be considered to be equally good. Also, alternative candidate aircraft intents may be equally valid, remembering that an aircraft intent can only produce a single trajectory without ambiguity but that the reverse is not true and the same trajectory may result from different aircraft intents.

In the method described above comprising outer and inner loops, the end of each iteration of the outer loop may see the best candidate aircraft intents presented to a user so that the user may select which candidate aircraft intents should be retained for the next iteration of the outer loop.

The method may further comprise ranking the provided candidate aircraft intents. The step of providing one or more candidate aircraft intents with the best cost function value or values respectively may comprise either (a) providing a ranked list of candidate aircraft intents or (b) providing the highest ranked candidate aircraft intent. Ranking the provided candidate aircraft intents may comprise at least one of: ranking according to the cost function values, ranking according to number of flight segments, and ranking according to the frequency with which that candidate aircraft intent appears in the evolved set. Ranking may reward the candidate aircraft intents with the fewest flight segments, for the same reasons as described above. Ranking according to the frequency with which that candidate aircraft intent appears in the evolved set rewards candidate aircraft intents that have been evolved independently multiple times by the evolutionary algorithm. The ranking may be used to determine which candidate aircraft intents are to be retained at the end of each iteration of the outer loop, when that method is being employed.

The present disclosure also resides in a computer system programmed to implement any of the methods described above. The present disclosure also resides in a computer program comprising computer program instructions that, when executed, cause a computer system to implement any of the methods described above. The present disclosure also resides in a computer readable medium having stored therein such a computer program. For example, the computer readable medium may comprise memory. Accordingly, the present disclosure also resides in a computer system comprising such a memory.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
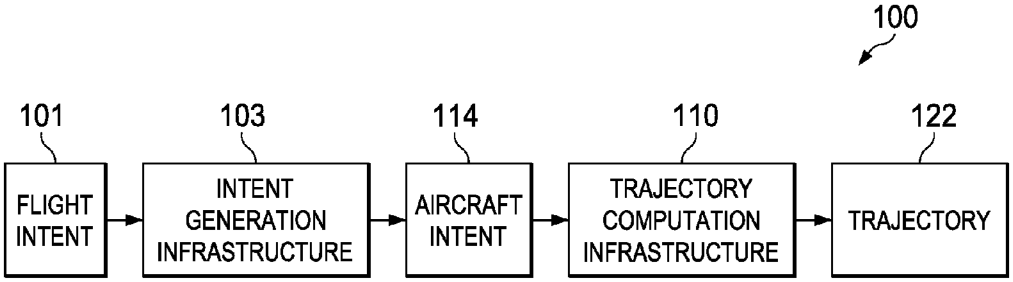
FIG. 1 is a system for computing an aircraft's trajectory using flight intent and aircraft intent.

The following information regarding trajectory prediction may assist in understanding the present disclosure. The process of predicting the trajectory of an air vehicle may involve the following pieces of information.

Aircraft intent (AI) is a formal description of how the air vehicle is to be operated during the time interval for which the predicted trajectory is valid. This information, which can be expressed by means of an aircraft intent description language (AIDL) captures all the details related to the specific aircraft motion that gives rise to the trajectory of interest.

The aircraft performance model (APM) provides all the aircraft-specific details that influence aircraft response. For example, it may include aerodynamic and propulsive characteristics, preferred and default flap schedules and other maneuvers, operational limitations, etc.

The Earth model (EM) provides all the details necessary to represent mathematically the influences of the environment on the aircraft motion. For example, it may reflect gravity, geopotential, atmospheric conditions, etc. The Earth model provides 4D predictions (i.e. for any given position and time) of wind velocity, pressure and temperature.

The prediction process also requires a formulation of the initial conditions (IC), namely the parameters that characterize the aircraft state (position, velocity, and attitude) at the beginning of the time interval of interest.

The trajectory computation process essentially consists of solving a mathematical problem that arises from a certain formulation of the air vehicle's motion physics made out in terms of the aforementioned elements. The result is the aircraft trajectory (AT), i.e. a discrete sequence of aircraft states (position and velocity, and optionally attitude and other additional characteristics of the motion).

In order to predict aircraft trajectory unambiguously, one must solve a set of differential equations that model both aircraft behavior and atmospheric conditions. The computation process requires inputs corresponding to the aircraft intent, often derived from flight intent.

Aircraft intent must be distinguished from flight intent. Flight intent may be thought of as a generalization of the concept of a flight plan, and so will reflect operational constraints and objectives such as intended or required route and operator preferences. Generally, flight intent will not unambiguously define an aircraft's trajectory, as the information it contains need not close all degrees of freedom of the aircraft's motion. Flight intent also comprises instructions that span flight segments. However, instances of flight intent may not contain instructions that cover all threads, and so some degrees of freedom of the aircraft may be left open. Therefore, there may be many aircraft trajectories that would satisfy a given flight intent. Flight intent may be regarded as a basic blueprint for a flight or a set of requirements that the ensuing aircraft trajectory must comply with, but that lacks the specific details that are present in the aircraft intent and that are required to determine unambiguously how the aircraft will behave as to meet these requirements (i.e. as to exhibit a particular trajectory).

For example, the instructions to be followed during a standard terminal arrival route (STAR) or a standard instrument departure (SID) route that typically appear in the airport information publication (AIP) departure/arrival charts would correspond to an example of flight intent. In addition, airline preferences such as a prescribed cost index (e.g. describing a preference towards prioritizing punctuality of flights against economic cost of flights) to be achieved may also form an example of flight intent. To derive aircraft intent instances from flight intent like a SID procedure, the airline's operational preferences and the actual pilot's decision making process can be combined.

FIG. 1 shows a basic structure 100 to derive aircraft intent, and how aircraft intent may be used to determine and compute the aircraft's trajectory univocally. In essence, flight intent 101 is provided as an input to an intent generation infrastructure 103. The intent generation infrastructure 103 determines aircraft intent 114 using the instructions provided by the flight intent 101 and other inputs to ensure a set of aircraft intent instructions is provided that will allow an unambiguous determination of the trajectory. The aircraft intent 114 output by the intent generation infrastructure 103 may then be used as an input to a trajectory computation infrastructure 110. The trajectory computation infrastructure 110 calculates the resulting trajectory 122 unambiguously determined beforehand by the aircraft intent 114, for which additional inputs are required to solve the equations of motion of the aircraft.

Figure 2:
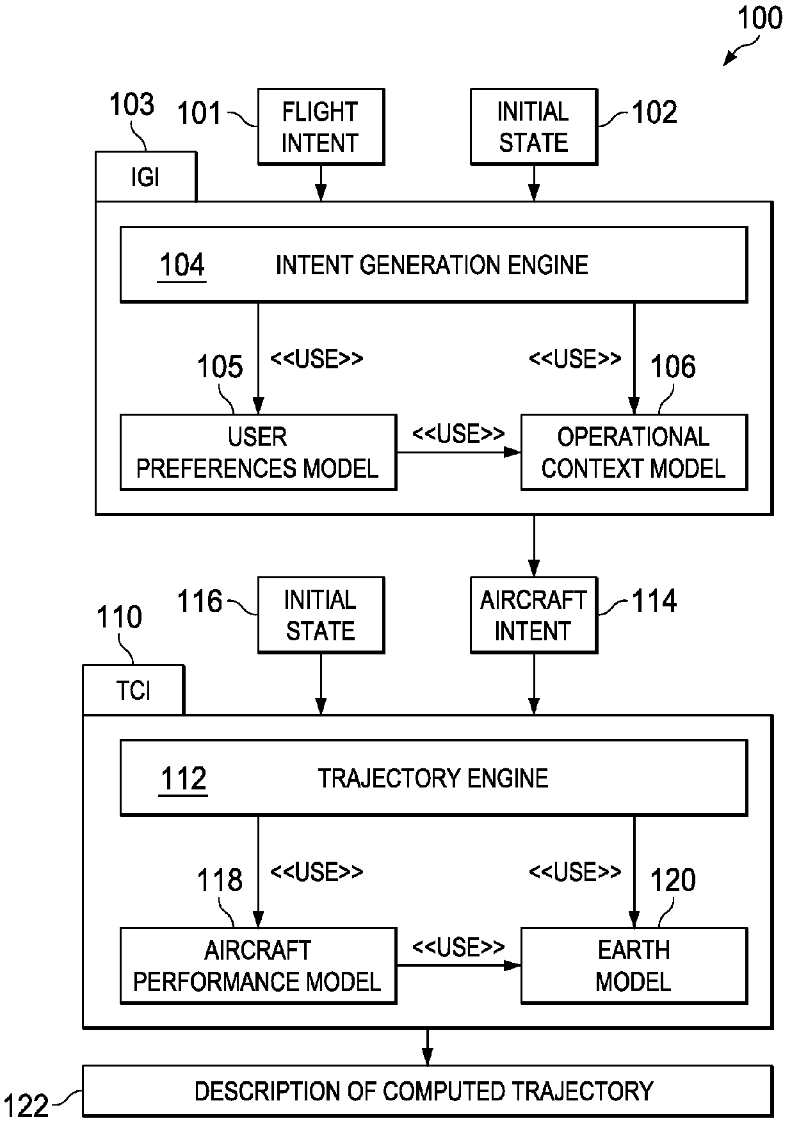
FIG. 2 shows the system of FIG. 1 in greater detail.

FIG. 2 shows the structure 100 of FIG. 1 in further detail. As can be seen, the intent generation infrastructure 103 receives a description of the flight intent 101 as an input along with a description of the initial state 102 of the aircraft (the initial state of the aircraft may be defined as part of the flight intent, in which case these two inputs are effectively one and the same). The intent generation infrastructure 103 comprises an intent generation engine 104 and a pair of models, one encompassing the user preferences model 105 and one representing the operational context model 106 of the aircraft.

The user preferences model 105 embodies the preferred operational strategies governing the aircraft. This includes, for example, the preferences of an airline with respect to loads (both payload and fuel); how to react to meteorological conditions such as temperature, wind speeds, altitude, jet stream, thunderstorms, and turbulence as this will affect the horizontal and vertical path of the aircraft as well as its speed profile; cost structure such as minimizing time of flight or cost of flight, maintenance costs, environmental impact; communication capabilities; passenger comfort requirements and security considerations.

The operational context model 106 embodies constraints on use of airspace, e.g. those imposed by the air traffic control to all flights operating within the given airspace such as speed, altitude restrictions, etc. The intent generation engine 104 uses the flight intent 101, initial state 102, user preferences model 105 and operational context model 106 to provide the aircraft intent 114 as its output. The process performed by the intent generation infrastructure 103 can be seen as determining a particular way of commanding the aircraft such that the resulting trajectory 122 meets the requirements set by the specific flight intent 101 and those generally imposed by the user 105 and the operational context 106.

FIG. 2 also shows that the trajectory computation infrastructure 110 comprises a trajectory engine 112. The trajectory engine 112 requires as inputs both the aircraft intent description 114 explained above and also the initial state 116 of the aircraft. The initial state 116 of the aircraft may be defined as part of the aircraft intent 114 in which case these two inputs are effectively one and the same. The initial state 116 may consist of the same information as the initial state input 102 provided to the intent generation infrastructure 103 or it may be augmented to include further aspects of the initial aircraft state as needed to determine an unambiguous trajectory. For the trajectory engine 112 to provide a description of the computed trajectory 122 for the aircraft, the trajectory engine 112 uses two models: an aircraft performance model 118 and an Earth model 120.

The aircraft performance model 118 provides the values of the aircraft performance aspects required by the trajectory engine 112 to integrate the equations of motion. These values depend on the aircraft type for which the trajectory is being computed, the aircraft's current motion state (position, velocity, weight, etc.) and the current local atmospheric conditions. In addition, the performance values may depend on the intended operation of the aircraft, i.e. on the aircraft intent 114. For example, a trajectory engine 112 may use the aircraft performance model 118 to provide a value of the instantaneous rate of descent corresponding to a certain aircraft weight, atmospheric conditions (pressure altitude and temperature) and intended speed schedule (e.g. constant calibrated airspeed). The trajectory engine 112 will also request from the aircraft performance model 118 the values of the applicable limitations so as to ensure that the aircraft motion remains within the flight envelope. The aircraft performance model 118 is also responsible for providing the trajectory engine 112 with other performance-related aspects that are intrinsic to the aircraft, such as flap and landing gear deployment times.

The Earth model 120 provides information relating to environmental conditions, such as the state of the atmosphere, weather conditions, gravity and magnetic variation.

The trajectory engine 112 uses the inputs 114 and 116, the aircraft performance model 118 and the Earth model 120 to solve a set of equations of motion. Many different sets of equations of motion are available that vary in complexity, and that may reduce the aircraft's motion to fewer degrees of freedom by means of a certain set of simplifying assumptions. Any of these sets of equations of motion may be used with the present disclosure.

The trajectory computation infrastructure 110 may be air-based or land-based. For example, the trajectory computation infrastructure 110 may be associated with an aircraft's flight management system that controls the aircraft on the basis of a predicted trajectory that captures the airline operating preferences and business objectives. The primary role for land-based trajectory computation infrastructures 110 is for air traffic management.

The basic relationship connecting aircraft intent 114, the aircraft performance model 118, the Earth model 120, the initial conditions 116 and the aircraft trajectory 122 can be written, using set notation, as $\{AI, ARM, EM, IC\} \Rightarrow AT$. In other words, given an instance of aircraft intent 114, for a specific aircraft (as reflected by the aircraft performance model 118) performing in a certain environment (reflected by the Earth model 120), starting from the given initial conditions (116), the resulting aircraft trajectory (122) is univocally determined.

Formally speaking, the opposite is not true. That is to say, given an aircraft trajectory 122 (and hence initial conditions because $IC \subset AT$) that belongs to a specific aircraft model (from the aircraft performance model 118) performing in a certain environment (from the Earth model 120), there are in principle many aircraft intents 114 that could give rise to that aircraft trajectory 122. This is because the relationship between $\{APM, AT, EM\}$ and AI is not objective. So, when determining aircraft intent from a trajectory, it is entirely possible that more than a single solution might exist (i.e. the calculation may well find multiple aircraft intents, each of which could give rise to the trajectory seen).

Figure 3A:
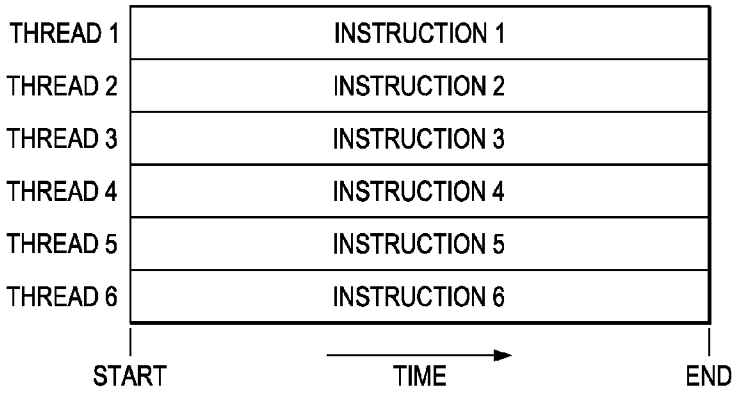
FIGS. 3*a* to 3*c* are three schematic representations of aircraft intent.
Figure 3B:
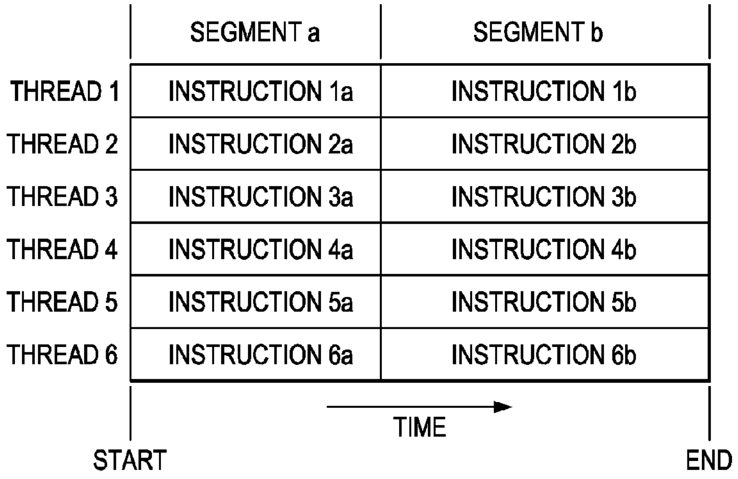
Figure 3C:
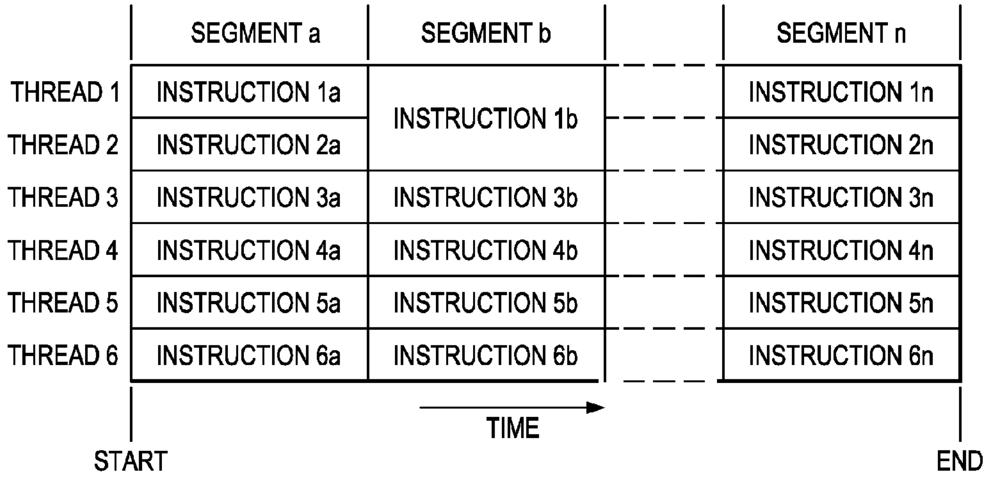

FIGS. 3*a* to 3*c* show how aircraft intent may be visualized. In this example, an aircraft is considered to be defined by six degrees of freedom, three of which relate to degrees of freedom of aircraft motion and three of which relate to degrees of freedom of aircraft configuration. For example, one degree may relate to horizontal motion and one degree might relate to landing gear configuration. The six degrees are shown as six threads (thread 1 to thread 6) that extend throughout the time of the trajectory being considered. The time elapsed through the trajectory is shown from left to right in FIGS. 3*a* to 3*c*, with the start and end times indicated.

Each thread is filled by one or more instructions that define that degree of freedom. In principle, a single instruction may be all that is required to define one thread through the trajectory being considered as illustrated in FIG. 3*a*. In practice, normally more than a single instruction is required per thread. FIG. 3*b* shows an example of two instructions per thread, and FIG. 3*c* shows a general example comprising n instructions per thread. Where there are multiple instructions per thread, this divides the trajectory into flight segments, with the end of an instruction creating an end to a flight segment.

In FIGS. 3*a* to 3*c*, instructions of equal length are shown such that, at the start of each flight segment, all threads also start with a new instruction. This need not be the case. Some instructions may span multiple flight segments. For example, an instruction to maintain a constant Mach speed may span three flight segments, whereas other instructions may first define maintaining a heading, then define turning to a new heading and then define maintaining the new heading. In addition, a single instruction may span more than a single thread. An example is shown in FIG. 3*c* where the second flight segment (segment b) contains an instruction (instruction 1) that defines both the first and second threads. For example, the instruction may be a vertical navigation guidance mode (VNAV) that may define three threads relating to vertical motion, throttle configuration, and high lift devices configuration.

Figure 4:
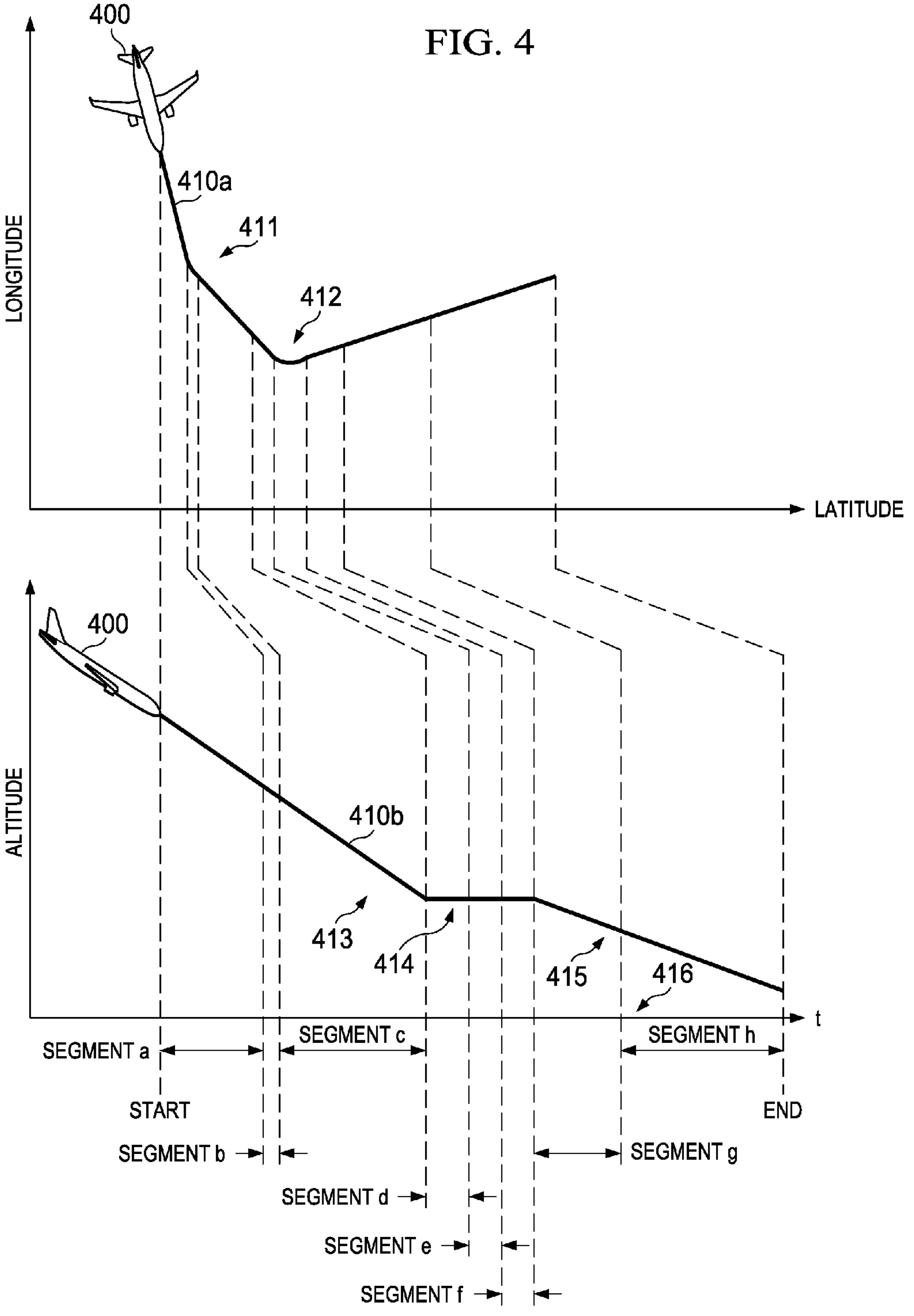
FIG. 4 shows the horizontal and vertical profiles of a trajectory, and how the trajectory may be divided into flight segments.

FIG. 4 shows an example of an aircraft 400 flying an approach into an airport and shows the resulting trajectory 410. The horizontal profile is shown in the upper part of the figure and the vertical profile is shown in the lower part of the figure. The figure also shows how the trajectory may be decomposed into flight segments according to the instructions of the aircraft intent.

The horizontal profile 410*a* comprises three sections of constant heading divided by two left turns shown at 411 and 412. The vertical profile 410*b* comprises an initial constant rate of descent 413, followed by a phase of maintaining altitude 414 and then a phase of maintaining a constant rate of descent 415. The phase of flight where altitude is held 414 begins shortly before turn 412 is started and ends shortly after turn 412 is completed. These changes in motion lead to the following segments in the aircraft intent. Segment a starts with the start of the trajectory and requires a heading to be maintained and a constant rate of descent. Segment b is triggered by a change to a turn to a new heading instruction, the start of the turn marking the start of segment b, and the end of the turn marking the end of segment b. Segment c sees heading maintained and the rate of descent maintained. Segment d is triggered by an instruction to maintain altitude. Segment e corresponds to the instruction to change heading, while the maintain altitude instruction remains in force. Segment f sees an instruction to maintain the new heading while still maintaining altitude, which ends when the new maintain a constant rate of descent instruction triggers segment g.

The above example is simplified, and further instructions are likely and so further flight segments may arise. For example, configuration changes may be required. By way of illustration, segment h is shown in FIG. 4 that corresponds to an extend landing gear instruction at 416. In addition, speed control will be required during an approach to an airport, and this will give rise to further instructions not illustrated in FIG. 4.

Figure 5:
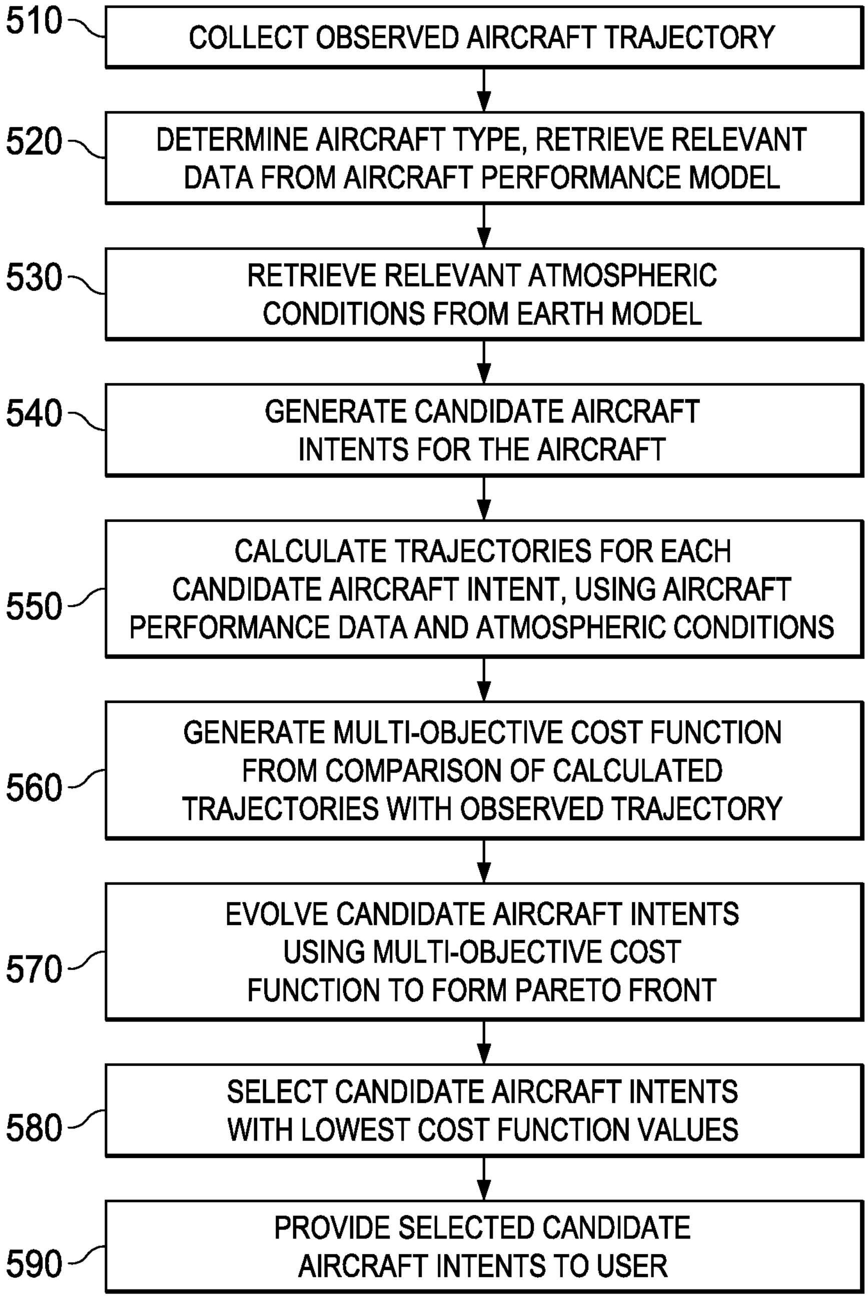
FIG. 5 is a schematic representation of a method of providing aircraft intent data of an aircraft according to a first embodiment of the present invention.

FIG. 5 shows an embodiment of a method of inferring aircraft intent using observations of a trajectory 410 flown by an aircraft 400. The method may be implemented using a computer system to perform the calculations required. Any type of commonly-available computer system may be used to implement the method, provided it has sufficient performance to perform the calculations at the required speed. The computer system may be conventional in providing input devices like keyboards, computer mice, touch screens and microphones, and providing output devices like monitors, displays and speakers. Data storage means may be provided like volatile and non-volatile memory. The computer system may be centralized, or may be distributed with connections provided by a network. For example, the computer system may be located at an airport and may ingest trajectory surveillance data related to the airspace around the airport, such as a defined terminal maneuvering area. The computer system may be required to determine the aircraft intent of multiple aircraft, and so the performance of the computer system may be specified with this in mind.

Turning now to FIG. 5, the method of inferring aircraft intent begins at step 510 where the trajectory 410 of an aircraft of interest 400 is collected from the appropriate surveillance source. This may be done using any convenient means. For example, radar data may be used to provide the aircraft trajectory 410, and ADS data such as ADS-A, ADS-B and ADS-C data may be used. The trajectory 410 may be saved into memory.

At 520, the aircraft type is determined. For example, the radar trace may be used to identify the aircraft's call sign or tail number, and this may be correlated against records to determine the aircraft's type (e.g. Boeing 777). Data pertaining to the aircraft type is retrieved from the aircraft performance model 118 and associated with the aircraft's trajectory 410 saved in memory.

At 530, the earth model is used to provide the atmospheric conditions affecting the aircraft 400 while flying its trajectory 410. For example, the four dimensional trajectory 410 observed for the aircraft 400 may be used to identify positions of the aircraft 400 along the trajectory 410, and data retrieved that describes the atmospheric conditions prevailing at each position at the time the aircraft 400 was at that position.

At 540, the computer system generates a set of initial candidate aircraft intents that might describe the trajectory 410 flown by the aircraft 400. This initial population of aircraft intents is generated randomly, as is described in more detail below.

At 550, a trajectory is calculated for each initial candidate aircraft intent generated. That is, the initial candidate aircraft intent, the associated initial conditions implied by the candidate aircraft intent, the aircraft performance data and the atmospheric conditions data are used by the trajectory computation engine 112 to calculate a corresponding calculated trajectory.

Next, at 560, each of the calculated trajectories is compared to the observed trajectory 410. This process is used to identify the best of the initial candidate aircraft intents and to evolve the candidate aircraft intents to one that is most likely to match the actual aircraft intent of the aircraft 400 that gave rise to the observed trajectory 410. That is, successfully matching a calculated trajectory to the observed trajectory 410 is used as an indication that the associated candidate aircraft intent accurately describes the actual aircraft intent.

This comparison of trajectories is used to generate a multi-objective cost function that characterizes the difference between each calculated trajectory and the observed trajectory 410. This multi-objective cost function may use two principal, competing measures to characterize how well the calculated trajectory matches the observed trajectory 410. The first measure may be the root mean square deviation between the trajectories, and how this compares to a threshold value. The second measure may count the number of time intervals over which the root mean square deviation is less than the threshold. The time intervals may correspond to flight segments, although this need not be the case.

At 570, the candidate aircraft intents are evolved by the computer system. The calculation uses evolutionary algorithms to evolve the candidate aircraft intents to reflect the actual aircraft intent better. The evolutionary algorithms use the multi-objective cost function to drive the evolution. That is, the evolutionary algorithm evolves new candidate aircraft intents, calculates the corresponding trajectories, and calculates a new value for the cost function with the aim of minimizing the cost function value. The evolutionary algorithm seeks on the one hand to minimize the root mean square deviation between the trajectories and to ensure the root mean square difference is within the threshold value while, on the other hand, the evolutionary algorithm seeks to maximize the number of time intervals over which the root mean square deviation falls within the threshold. These two competing demands lead to candidate aircraft intents that form a set of Pareto solutions occupying a Pareto front. These candidate aircraft intents are equally valid solutions, and may arise either because they represent equally good estimates or because they both represent valid aircraft intents (remembering that multiple aircraft intents may give rise to any particular trajectory). Further explanation of this step follows below.

With a set of solutions determined, the set of candidate aircraft intents having the lowest cost function values are selected at step 580 and, at step 590, these candidate solutions are provided to a user for the user to select one of the candidate aircraft intents as being the inferred aircraft intent. The candidate aircraft intents may be presented in different ways. The candidate aircraft intents may be ranked. For example, candidate solutions having a range of the lowest cost function values may be presented, with the lowest values being ranked highest. Other criteria may be used for ranking, such as the least number of flight segments or the number of times that candidate aircraft intent appears in the results (the nature of evolutionary algorithms means that the same solution may be evolved independently more than once). Of course, any of these criteria may be used to select a candidate aircraft intent automatically rather than allowing a user to select an inferred aircraft intent.

Figure 6:
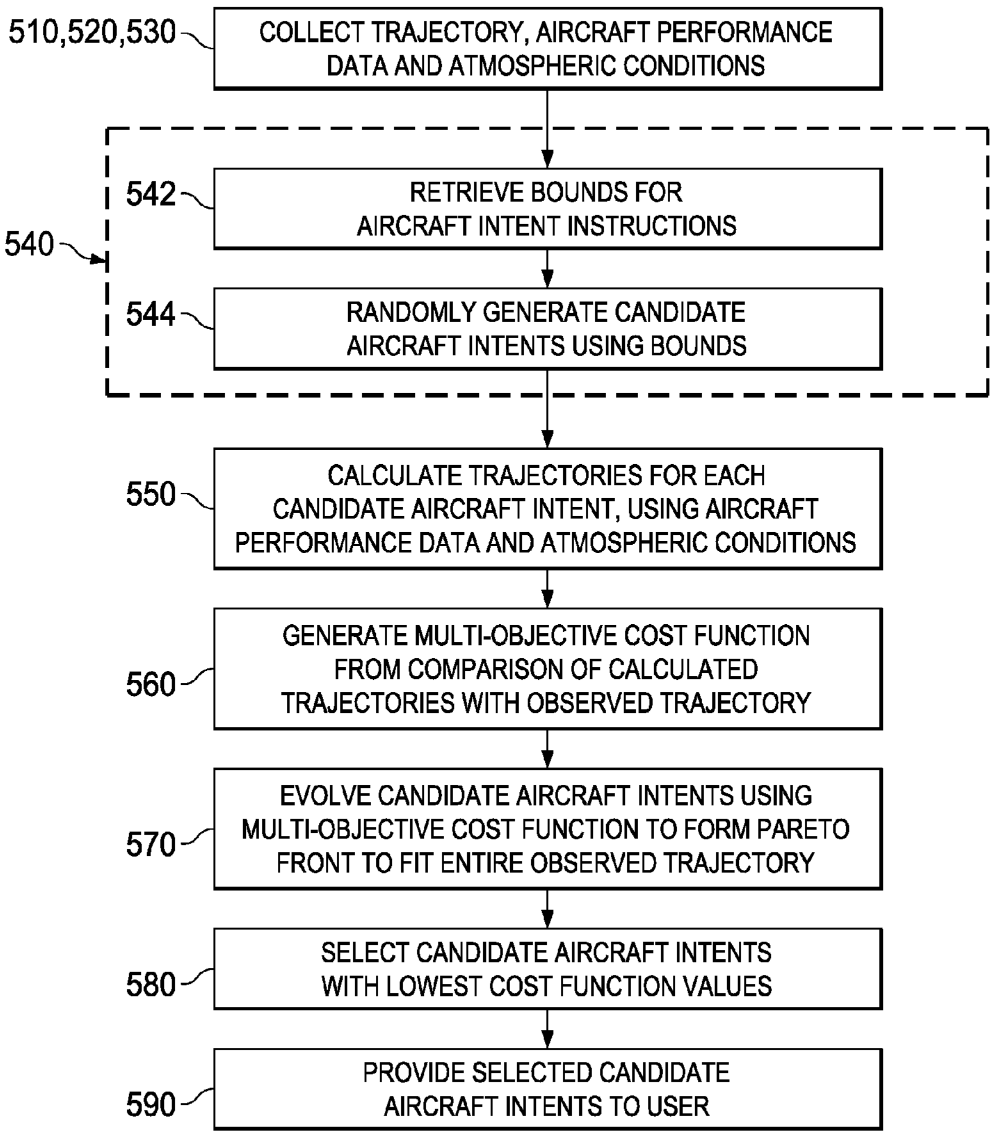
FIG. 6 is a schematic representation to show part of the method of FIG. 5 in greater detail.

FIG. 6 shows the method of inferring aircraft intent of FIG. 5 in more detail. The method of FIG. 6 starts with steps 510, 520 and 530 as already described above with respect to FIG. 5. Thus, the observed aircraft trajectory 410 is retrieved, along with aircraft performance date relating to the aircraft 400 and the relevant atmospheric conditions.

At step 540, candidate aircraft intents are generated. To do this, at step 542, bounds for the aircraft intent instructions are retrieved. For example, the aircraft performance data may be used to define upper and lower airspeeds for the aircraft, and to determine maximum speeds when landing gear and high lift devices are deployed. Next, at step 544, the computer system generates a pre-determined number of candidate aircraft intents. The generation may be random, within bounds. Specifically, the aircraft intents may be generated with any set of instructions although parameters must be set within the bounds retrieved at step 542. Consequently, the trajectory may be divided into any number of flight segments of any length, and the instructions for each segment are generated randomly. Strategies may be used to ensure that the initial population of candidate aircraft intents is suitably diverse, as is well known in the art. Although most initial guesses will bear little resemblance to the actual aircraft intent, the evolutionary process will quickly evolve the candidate aircraft intents closely resembling the actual aircraft intent and will then refine those candidate solutions to ensure a close match.

At step 550, each candidate aircraft intent is used to calculate a corresponding trajectory as already described with respect to step 550 of FIG. 5. Step 560 of FIG. 5 is followed next, that is step 560 of FIG. 6 sees a multi-objective cost function formed from a comparison of the calculated trajectories with the observed trajectory 410.

At step 570, the candidate aircraft intents are evolved by the computer system using evolutionary algorithms. That is, repeated iterations are used to evolve the candidate aircraft intents to provide calculated trajectories that match better the observed trajectory. This may be done in any of the well-known ways. For example, at the end of each iteration, several well selection criteria are applied. Some of the better candidate aircraft intents are retained for the next iteration. In this embodiment, approximately the top 20% may be retained as ranked by the lowest cost function value. Then, a random selection of approximately 60% may be cross-bred (i.e. portions of their aircraft intents are swapped) and the resulting aircraft intents used in the next iteration. A further 10% (approximately) of the aircraft intents may be used in the next iteration are derived by randomly selecting 10% of the candidate aircraft intents from the previous iteration and randomly introducing mutations, i.e. removing a portion of the aircraft intent and replacing it with a randomly generated portion. The remaining 10% of aircraft intents used in the next iteration may be randomly generated. Thus, genetic diversity is introduced into the evolutionary process, and the selection process ensures that the better candidate aircraft intents are retained.

Step 570 may end after a pre-determined number of iterations of the evolutionary algorithm have been performed. However, in this embodiment, it is preferred to end the evolution process according to a test performed at the end of each iteration of the evolutionary algorithm. The test may use the cost function values of the candidate solutions, or at a range of the best candidate solutions. How the cost function values change from iteration to iteration may be used to indicate convergence of the evolutionary process, for example when the cost function values improve by less than a convergence threshold, step 570 exits. Alternatively, the cost function values themselves may be used to cause step 570 to exit, for example when the best candidate solution has a cost function value below a limit or an average cost function value is below a limit or a certain number of candidate solutions have cost function values below a certain limit. Combinations of these tests may also be used to determine when step 570 exits.

When step 570 exits, the best candidate aircraft intents are selected at step 580 and presented to the user at step 590, in accordance with any of the methods and variations described with respect to steps 580 and 590 in FIG. 5.

Figure 7A:
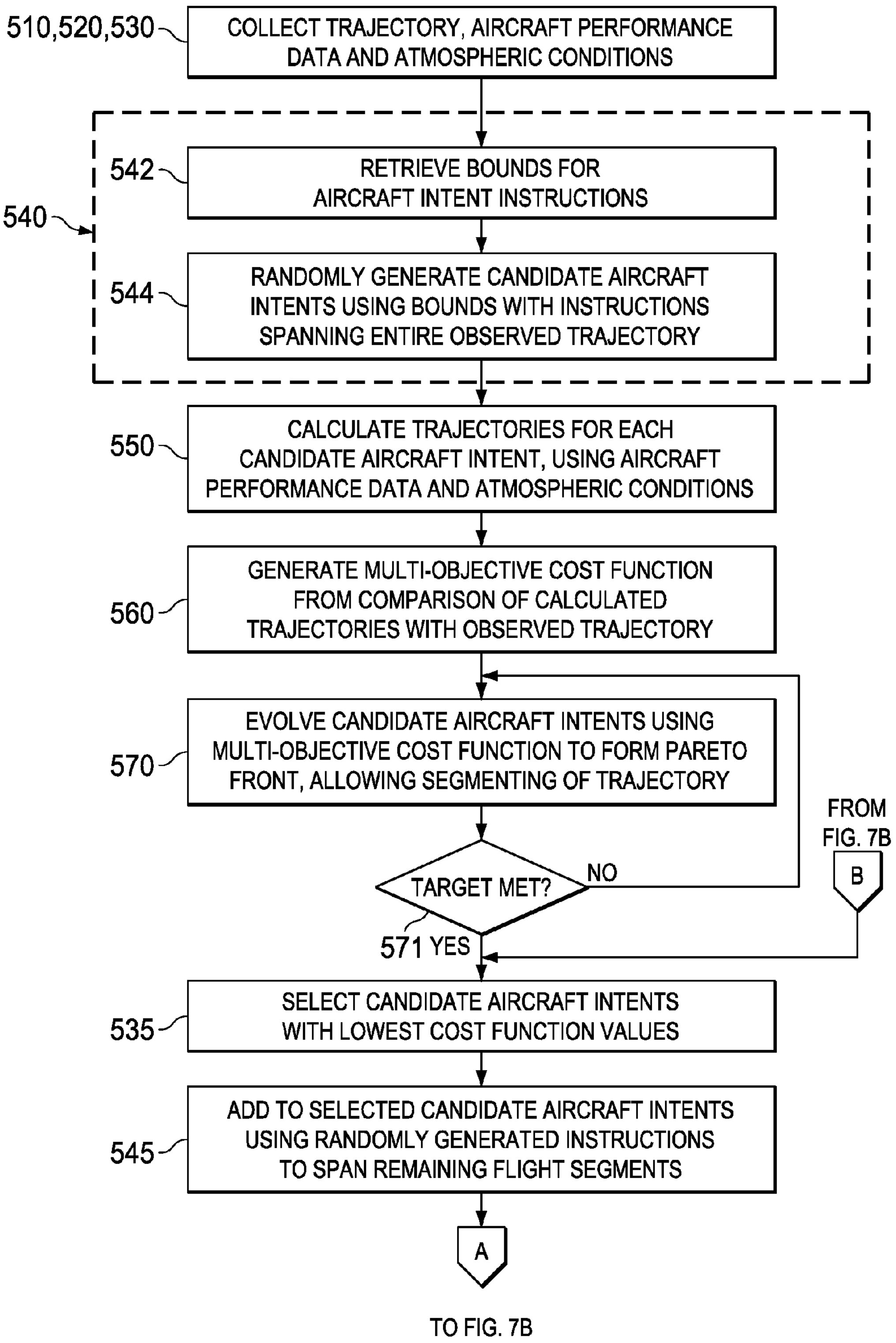
FIGS. 7*a*-7*b* show an alternative arrangement to FIG. 5.
Figure 7B:
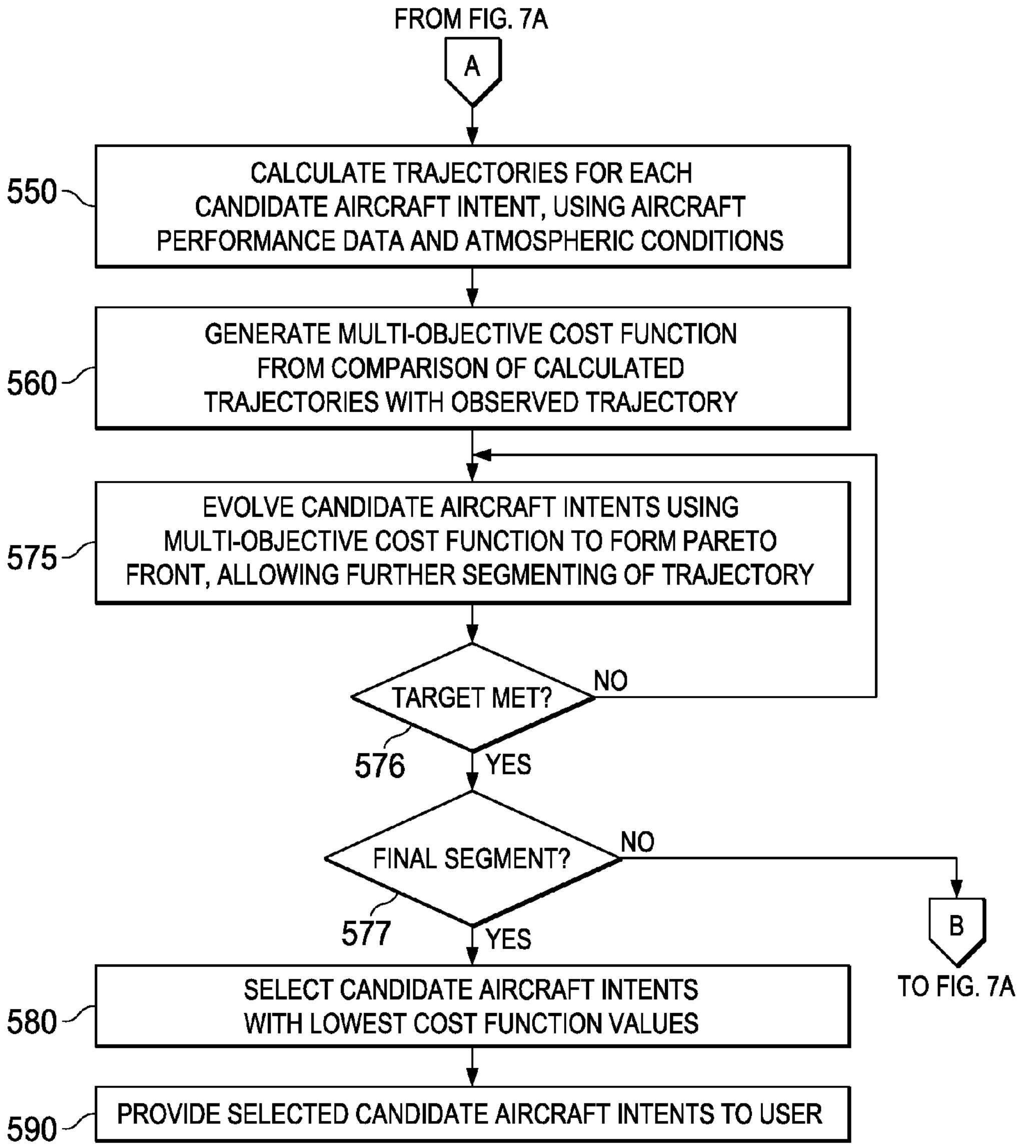

FIGS. 7*a*-7*b* show an alternative embodiment to that shown in FIG. 6. As many parts are the same, the following description focuses on the differences. The principal difference is that the method of FIGS. 7*a*-7*b* sees the evolutionary algorithm stage operate one flight segment at a time. That is, the candidate aircraft intents are optimized for a particular flight segment, before the evolutionary algorithm progresses to optimizing the aircraft intents for the next flight segment, and so on.

The observed aircraft trajectory 410, the aircraft performance data and the atmospheric conditions are retrieved in steps 510, 520 and 530 as has already been described. As before, step 520 begins with bounds being retrieved at 542.

Step 544*a* sees a difference. A further restriction is placed on the random generation of candidate aircraft intents: all instructions generated are required to span the entire observed trajectory 410 such that there is no segmentation of the observed trajectory 410. Instructions may be allowed to apply to more than a single thread, but still within the requirement that the instruction will apply to all the applicable threads for the entire length of the observed trajectory. Thus, the method initially tries to derive an aircraft intent with a single flight segment occupying the entire observed trajectory 410.

With the candidate aircraft intents generated at step 540, the method progresses through steps 550 and 560 where trajectories are calculated and the cost function formed as has been described previously.

The candidate aircraft intents are evolved at step 570. The evolutionary algorithm is constrained to keep a single instruction per thread, but is free to allow the length of that instruction to vary subject to beginning at the start time of the observed trajectory 410. Consequently, step 570 evolves candidate aircraft intents that define the initial part of the observed trajectory 410 only, while leaving the subsequent part of the observed trajectory undefined. Hence, the evolutionary algorithm produces a set of candidate aircraft intents at step 570 that produce part-trajectories that match the initial part of the observed trajectory 410 well. As indicated at step 571, the results of each iteration of the evolutionary algorithm are tested to see whether a further iteration should be performed. This test may be performed as described above, albeit only in respect of the initial part of the observed trajectory 410 defined by the part-aircraft intent.

When the test at step 571 is passed, and evolution step 570 is exited, the method continues to step 535 where the candidate aircraft intents with the lowest cost function values are selected to be retained for the next part of the method. In the next part of the method, the part-aircraft intents of the selected candidate aircraft intents are developed to match the next part of the observed trajectory 410.

This is achieved, starting at step 545 where further instructions are added to the candidate aircraft intents. Similarly to step 542, bounds are retrieved and used in constraining the random values taken by instruction parameters. Each instruction added is constrained to occupy the remainder of each thread; that is each instruction starts at the end of the instructions already present in the candidate aircraft intent and must end at the end of the observed trajectory 410. As before, an instruction may apply to more than a single thread. In this embodiment, the different candidate aircraft intents may not necessarily end at the same point in the observed trajectory 410. However, in other contemplated embodiments, the evolutionary algorithm is constrained to keep the end points of the instructions currently being evolved to be the same. In any event, step 545 sees a new set of candidate aircraft intents being generated where each candidate aircraft intent defines the entire observed trajectory 410 with two flight segments.

It should be noted that one or more candidate aircraft intents may arise from step 570 that occupy the entire observed trajectory: thus, a check may be made at the start of step 545 for such candidate aircraft intents and these intents may be either removed and placed into a set of final results or they may be input back into the evolutionary algorithm without the addition of further instructions.

Steps 550 and 560 are then repeated. That is a complete trajectory is calculated for each candidate aircraft intent and a cost function is formed that reflects a comparison of the complete trajectories (i.e. the trajectories resulting from both flight segments).

Step 575 sees the candidate aircraft intents evolved according to the evolutionary algorithm. This step is similar to step 570, except that now the instructions for each first flight segment are fixed and only the instructions relating to the second flight segment are allowed to vary. The length of the second flight segment is allowed to vary, subject to the requirement it must start at the end of the first flight segment. Hence, the evolutionary algorithm evolves the candidate aircraft intents to form candidate aircraft intents that describe well first and second parts of the observed trajectory 410. The second part of each candidate aircraft intent may or may not extend till the end of the observed trajectory. The evolutionary algorithm continues through iterations as determined by test step 576 that corresponds to test step 571.

Steps 535, 545, 550, 560, 575 and 576 essentially repeat as a loop, such that with each pass through the loop candidate aircraft intents are evolved that match better the next part of the observed trajectory 410 under consideration. That is, the evolutionary algorithm is repeatedly invoked to determine a suitable length for the next flight segment and to provide candidate aircraft intents that produce calculated trajectories that match well the observed trajectory 410 up to the end of the flight segment currently being considered. In this way, candidate aircraft intents are constructed one flight segment at a time, in chronological order.

Accordingly, the method comprises step 577: when the current evolutionary step 575 exits after the determination at step 576, a further determination is made at step 577. This second determination looks at each candidate aircraft intent to see whether the final flight segment has been defined, i.e. whether or not the latest flight segment added extends to the end of the observed trajectory. This step may be combined with the selection process of step 535 such that the length of only the best candidate aircraft intents is considered. Any candidate flight intents defining the full extent of the observed trajectory 410 may be either removed and placed into a set of final results or they may be input back into the evolutionary algorithm without the addition of further instructions.

Eventually, step 577 will determine that all candidate aircraft intents, or that the best candidate aircraft intents to be selected, define the full extent of the observed trajectory 410. When this point is reached, the method proceeds to steps 580 and 590 where, as described before, the best candidate aircraft intents are selected and presented to the user.

As will be appreciated, the above methods see the aircraft intents segmented by the evolutionary algorithm. This process can in theory lead to much segmentation in order to arrive at the lowest cost function possible (i.e. to ensure better correspondence between the calculated trajectories and the observed trajectory 410). In practice, the aircraft 400 is likely to have been flown with relatively few flight segments, so the selection process of which candidate aircraft intends to retain for the next iteration of the evolutionary algorithm may reward those candidate solutions with the fewest flight segments or, in the case of the method of FIG. 7, those with the longest flight segment currently under consideration.

Those skilled in the art will appreciate that variations may be made to the above embodiments without departing from the scope of the invention that is defined by the appended claims.

Moreover, additional applications of the present disclosure are contemplated. For example, to communicate a trajectory 122, such as a predicted trajectory or a desired trajectory, it may be necessary to apply compression algorithms so that a bandwidth is not exceeded. Lossless compression algorithms are available for this purpose. However, to achieve high compression ratios, it is often necessary to apply lossy compression algorithms. Such lossy algorithms are undesirable since the resolution of the communicated trajectory 122 is diminished. However, as explained above, an instance of aircraft intent 114 can unambiguously define a corresponding trajectory 122.

The methods of inferring aircraft intent 114 from trajectory 122 described above can therefore be used as a method of compression of trajectory 122. Any instance of aircraft intent 114 that unambiguously defines the trajectory 122 can be used. The compressed aircraft intent can be transmitted from a transmitting system to a receiving system instead of the trajectory. The aircraft intent can be decompressed to express the trajectory at the receiving system.

In other words, a preferred embodiment of a method of transmitting aircraft trajectory data from a transmitting system to a receiving system may comprise: inferring aircraft intent data from the aircraft trajectory data using the transmitting system; transmitting the inferred aircraft intent data; and deriving trajectory data from the transmitted aircraft intent data.

Preferably, the aircraft intent data is inferred from the aircraft trajectory data using an Earth model and an aircraft performance model stored by the transmitting system.

Preferably, the trajectory data is derived at the receiving system from the transmitted aircraft intent data using the same Earth model and the aircraft performance model used to infer the aircraft intent data.

In some cases, these models may already be available at the receiving system. In other cases, the method may further comprise transmitting the Earth model and the aircraft performance model from the transmitting system to the receiving system.

Optionally, the aircraft intent data can itself be compressed by the transmitting system (preferably, using lossless compression), and decompressed after transmission by the receiving system.

This does not unduly increase the amount of data to be transmitted, since one Earth model and one aircraft performance model can be used to compress and decompress an unlimited number of trajectories 122.

It has been shown experimentally that compression ratios (the ratio of size of trajectory data to size of aircraft intent data) of 55:1 can be achieved using the above-described method.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

Figure 8:
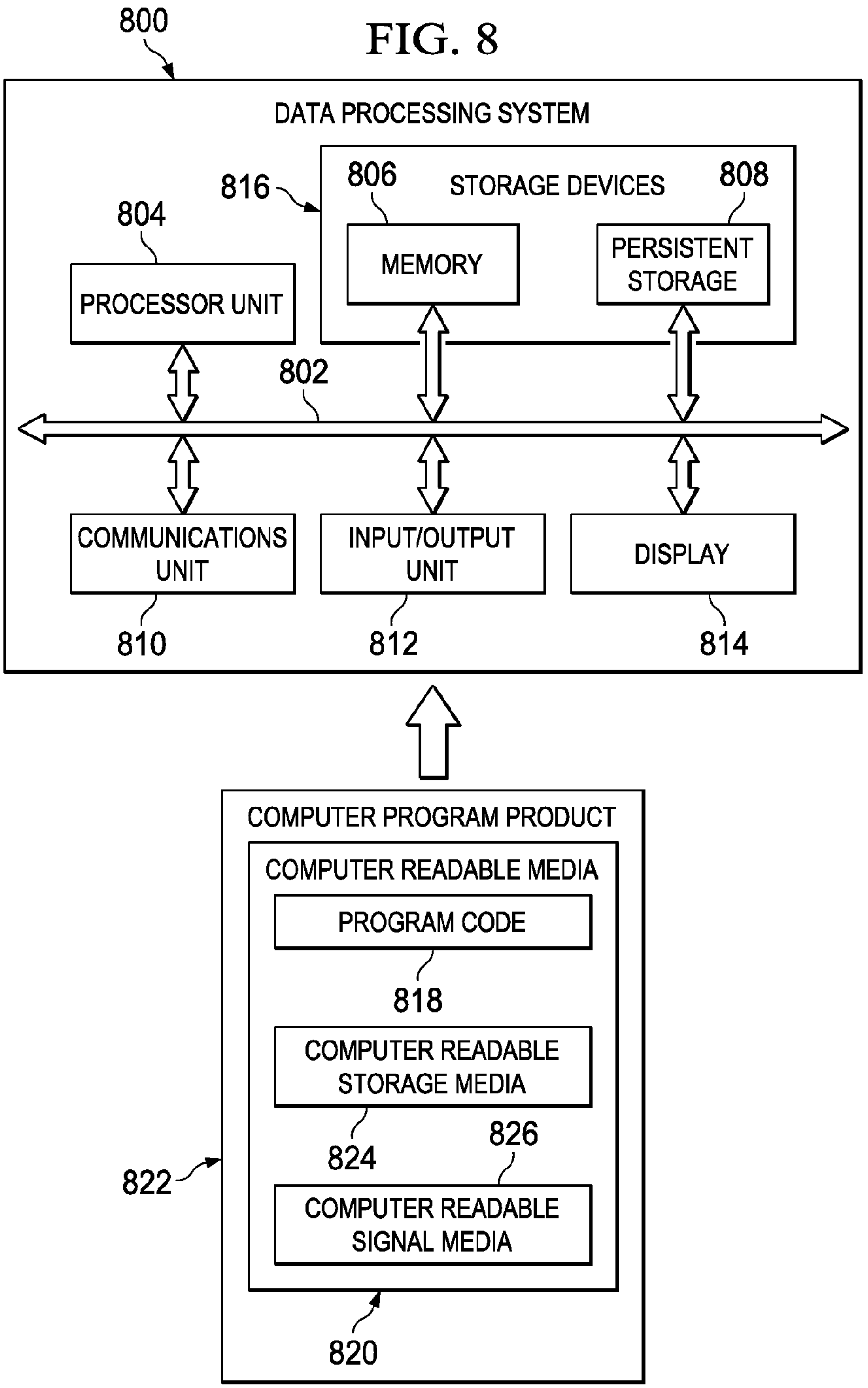
FIG. 8 is an illustration of a data processing system in accordance with an illustrative embodiment.

Turning now to FIG. 8, an illustration of a data processing system is depicted in accordance with an advantageous embodiment. In this example, data processing system 800 is an example of one implementation of a data processing device or system that may be used with the embodiments described herein. In this illustrative example, data processing system 800 includes communications fabric 802. Communications fabric 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications fabric 802.

Processor unit 804 serves to run instructions for software that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another advantageous example, processor unit 804 may be a symmetric multi-processor system containing multiple processors of the same type.

Memory 806 and persistent storage 808 are examples of storage devices 816. A storage device is any piece of hardware that is capable of storing information such as, for example, without limitation, data, program code in functional form, and/or other suitable information either on a temporary basis and/or a permanent basis. Storage devices 816 may also be referred to as computer readable storage devices in these examples. Memory 606, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 608.

Communications unit 810, in these examples, provides for communications with other data processing systems or devices. In these examples, communications unit 610 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these advantageous examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage

808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some advantageous embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different advantageous embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another advantageous example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or transmit and receive data. Communications unit 810 may be, for example, a modem or a network adapter, two network adapters, or some combination thereof. Further, a memory may be, for example, memory 806, or a cache, such as found in an interface and memory controller hub that may be present in communications fabric 802.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of inferring the aircraft intent of an aircraft from an observed trajectory of the aircraft, the method comprising:

obtaining the observed trajectory of the aircraft;

determining a type of the aircraft and retrieving from memory aircraft performance data relating to that type of aircraft;

retrieving data regarding atmospheric conditions along the observed trajectory;

generating an initial set of candidate aircraft intents that provide an unambiguous description of how the aircraft may be flown and that allows a determination of an unambiguous resulting trajectory;

providing as inputs to a computer system the initial set of candidate aircraft intents, the aircraft performance data, and the atmospheric conditions data;

calculating from the inputs a calculated trajectory defined by each candidate aircraft intent in the initial set of candidate aircraft intents;

forming a multi-objective cost function from a comparison of each calculated trajectory to the observed trajectory;

using an evolutionary algorithm to evolve the set of initial candidate aircraft intents into an evolved set of candidate aircraft intents and repeating iterations of the evolutionary algorithm to evolve further the candidate aircraft intents of the evolved set, wherein the evolutionary algorithm uses a multi-objective cost function to obtain a cost function value that measures a goodness of each candidate aircraft intent; and providing one or more candidate aircraft intents with the best cost function value or values respectively.

2. The method of claim 1, wherein determining the trajectory of the aircraft comprises using radar data, ADS-B data or ADS-C data.

3. The method of claim 1 further comprising providing as a further input to the computer system initial conditions of the aircraft, and wherein the calculated trajectory defined by each candidate aircraft intent is calculated from the inputs and the further input.

4. The method of claim 3, further comprising generating a common set of initial conditions from the observed trajectory or generating different sets of initial conditions from the candidate aircraft intents.

5. The method of claim 1, further comprising retrieving a set of bounds, and randomly generating the initial set of candidate aircraft intents to include randomly generated values within the bounds.

6. The method of claim 1, further comprising randomly generating the initial set of aircraft intents while being guided to provide a broad range of candidate aircraft intents.

7. The method of claim 1, wherein the cost function is based upon the combination of (a) a point-by-point score derived from summing a deviation of the respective calculated trajectory from the observed trajectory at each of a number of points sampled along the observed trajectory, and (b) an overall consistency score derived from a length of the respective calculated trajectory that deviates from the observed trajectory by less than a threshold value.

8. The method of claim 1, wherein the candidate aircraft intents comprise threads, each thread defining a degree of freedom of the aircraft, and each thread extends from the start of the trajectory to the end of the trajectory, and wherein generating the initial set of candidate aircraft intents comprises, for each candidate aircraft intent, filling each thread with one or more instructions thereby closing all degrees of freedom of the aircraft throughout the trajectory.

9. The method of claim 8, wherein generating the initial set of candidate aircraft intents comprises, for each candidate aircraft intent, filling each thread with an instruction such that each thread contains only a single instruction spanning the entire trajectory.

10. The method of claim 9, wherein the calculated trajectories are divided into flight segments, a start and end of the flight segments being defined by starts and ends of the instructions, and wherein the method further comprises using the evolutionary algorithm to evolve a set of evolved candidate aircraft intents in a stepwise manner, each step comprising optimizing one flight segment at a time starting with the first flight segment and proceeding chronologically through the observed trajectory.

11. The method of claim 10, further comprising:

evolving the initial set of candidate aircraft intents iteratively to form the evolved set of candidate aircraft intents while allowing the length of the instructions to vary while keeping the start of each instruction tied to the start of the observed trajectory, and wherein the evolutionary algorithm uses the multi-objective cost function to obtain a cost function value that measures the goodness of each candidate aircraft intent based upon a comparison of the calculated trajectory calculated for the flight segment with the corresponding portion of the observed trajectory;

retaining the candidate aircraft intents with the best cost function values;

performing outer loops of iterations and inner loops of iterations, wherein:

the outer loop of iterations comprises:

generating a further initial set of candidate aircraft intents by generating multiple copies of the retained aircraft intents and adding an instruction to each thread of the copies of the retained candidate aircraft intents to extend from the end of the last flight segment to the end of the trajectory such that each thread is again filled by instructions spanning the entire trajectory, repeated iterations of the inner loop comprising evolving the further initial set of candidate aircraft intents to form further evolved sets of candidate aircraft intents while allowing the length of the instructions occupying the final flight segment to vary while keeping the start of each instruction tied to the end of the previous instruction, while the evolutionary algorithm uses the multi-objective cost function to obtain a cost function value that measures the goodness of each candidate aircraft intent based upon a comparison of the calculated trajectory calculated from the start of the observed trajectory to the end of the final flight segment with the corresponding portion of the observed trajectory, and retaining the candidate aircraft intents with the best cost function values;

wherein the outer loop of iterations are repeated until an evolved set of candidate solutions is produced that includes candidate aircraft intents with threads that are filled with instructions to span the entire observed trajectory.

12. The method of claim 1, further comprising providing multiple candidate aircraft intents with the best cost function values to a user for the user to select a preferred candidate aircraft intent.

13. The method of claim 1, further comprising ranking the provided candidate aircraft intents and the step of providing one or more candidate aircraft intents with the best cost function value or values respectively comprises either (a) providing a ranked list of candidate aircraft intents or (b) providing the highest ranked candidate aircraft intent.

14. The method of claim 13, wherein ranking the provided candidate aircraft intents comprises at least one of: ranking according to the cost function values, ranking according to number of flight segments, and ranking according to the frequency with which that candidate aircraft intent appears in the evolved set.

15. A system for inferring the aircraft intent of an aircraft from an observed trajectory of the aircraft, the system comprising:

a computing system;

a tangible non-transitory computer readable medium comprising instructions stored thereon, that when executed by the computer system, causes the computer system to:

obtain the observed trajectory of the aircraft;

determine a type of the aircraft and retrieve from memory aircraft performance data relating to that type of aircraft;

retrieve data regarding atmospheric conditions along the observed trajectory;

generate an initial set of candidate aircraft intents that provide an unambiguous description of how the aircraft may be flown and that allows a determination of an unambiguous resulting trajectory;

provide as inputs, the initial set of candidate aircraft intents, the aircraft performance data, and the atmospheric conditions data;

calculate from the inputs a calculated trajectory defined by each candidate aircraft intent in the initial set of candidate aircraft intents;

form a multi-objective cost function from a comparison of each calculated trajectory to the observed trajectory;

use an evolutionary algorithm to evolve the set of initial candidate aircraft intents into an evolved set of candidate aircraft intents and repeat iterations of the evolutionary algorithm to evolve further the candidate aircraft intents of the evolved set, wherein the evolutionary algorithm uses a multi-objective cost function to obtain a cost function value that measures a goodness of each candidate aircraft intent; and provide one or more candidate aircraft intents with the best cost function value or values respectively.

16. The system of claim 15, wherein the candidate aircraft intents comprise threads, each thread defining a degree of freedom of the aircraft, and each thread extends from the start of the trajectory to the end of the trajectory, and wherein instructions for generating the initial set of candidate aircraft intents comprises instructions that when executed by the computer system, causes the computer system to, for each candidate aircraft intent, fill each thread with one or more instructions thereby closing all degrees of freedom of the aircraft throughout the trajectory.

17. The system of claim 16, wherein instructions for generating the initial set of candidate aircraft intents further comprises instructions that when executed by the computer system, causes the computer system to, for each candidate aircraft intent, fill each thread with an instruction such that each thread contains only a single instruction spanning the entire trajectory.

18. A tangible non-transitory computer readable medium having stored thereon a computer program for inferring the aircraft intent of an aircraft from an observed trajectory of the aircraft, the computer program comprising instructions, that when executed by a computer system, causes the computer system to:

obtain the observed trajectory of the aircraft;

determine a type of the aircraft and retrieve from memory aircraft performance data relating to that type of aircraft;

retrieve data regarding atmospheric conditions along the observed trajectory;

generate an initial set of candidate aircraft intents that provide an unambiguous description of how the aircraft may be flown and that allows a determination of a unambiguous resulting trajectory;

provide as inputs, the initial set of candidate aircraft intents, the aircraft performance data, and the atmospheric conditions data;

calculate from the inputs a calculated trajectory defined by each candidate aircraft intent in the initial set of candidate aircraft intents;

form a multi-objective cost function from a comparison of each calculated trajectory to the observed trajectory;

use an evolutionary algorithm to evolve the set of initial candidate aircraft intents into an evolved set of candidate aircraft intents and repeat iterations of the evolutionary algorithm to evolve further the candidate aircraft intents of the evolved set, wherein the evolutionary algorithm uses a multi-objective cost function to obtain a cost function value that measures a goodness of each candidate aircraft intent; and provide one or more candidate aircraft intents with the best cost function value or values respectively.

19. The tangible non-transitory computer readable medium of claim 18, wherein the candidate aircraft intents comprise threads, each thread defining a degree of freedom of the aircraft, and each thread extends from the start of the trajectory to the end of the trajectory, and wherein instructions for generating the initial set of candidate aircraft intents comprises instructions that when executed by the computer system, causes the computer system to, for each candidate aircraft intent, fill each thread with one or more instructions thereby closing all degrees of freedom of the aircraft throughout the trajectory.

20. The tangible non-transitory computer readable medium of claim 19, wherein instructions for generating the initial set of candidate aircraft intents further comprises instructions that when executed by the computer system, causes the computer system to, for each candidate aircraft intent, fill each thread with an instruction such that each thread contains only a single instruction spanning the entire trajectory.

* * * * *